(12) United States Patent
Katsurahira

(10) Patent No.: US 6,930,674 B2
(45) Date of Patent: Aug. 16, 2005

(54) POSITION DETECTOR AND POSITION INDICATOR THEREFOR

(75) Inventor: Yuji Katsurahira, Saitama (JP)

(73) Assignee: Wacom Co., Ltd., Saitama-ken (JP)

( * ) Notice: Subject to any disclaimer, the term of this patent is extended or adjusted under 35 U.S.C. 154(b) by 329 days.

(21) Appl. No.: 10/228,078

(22) Filed: Aug. 27, 2002

(65) Prior Publication Data
US 2003/0047360 A1 Mar. 13, 2003

(30) Foreign Application Priority Data
Sep. 5, 2001 (JP) ........................................ 2001-269350

(51) Int. Cl.$^7$ ........................ G06K 11/18; G08C 21/00; G09G 5/00
(52) U.S. Cl. ...................... 345/173; 178/19.04; 345/179
(58) Field of Search ................................ 345/173–179; 178/18.01, 18.03, 18.05–18.07, 19.01–19.07, 20.01, 20.04

(56) References Cited

U.S. PATENT DOCUMENTS 5,699,084 A * 12/1997 Fukuzaki .................... 345/179
5,854,881 A * 12/1998 Yoshida et al. ............. 345/179
6,020,849 A * 2/2000 Fukuzaki .................... 345/179
6,667,740 B2 * 12/2003 Ely et al. .................... 345/179

* cited by examiner

Primary Examiner—Bipin Shalwala
Assistant Examiner—Laurel E. LeFlore
(74) Attorney, Agent, or Firm—Berenato, White and Stavish, LLC

(57) ABSTRACT

A position indicator contains a resonant circuit. A first resistor having a minimum resistance, a second resistor having a maximum resistance, and a variable resistor whose resistance varies within the range of minimum to maximum resistances are connected to the resonant circuit at first, second, and third specific times based on predetermined timing information supplied from a tablet. Signal levels detected by the tablet at the first and second specific times are used as a lower limit and an upper limit of an operation quantity. Within this range, a signal level detected at the third specific time is converted into an operation quantity. Thus, the continuous quantity can be detected at a fast sampling rate without being influenced by the height and tilt of the position indicator.

19 Claims, 9 Drawing Sheets

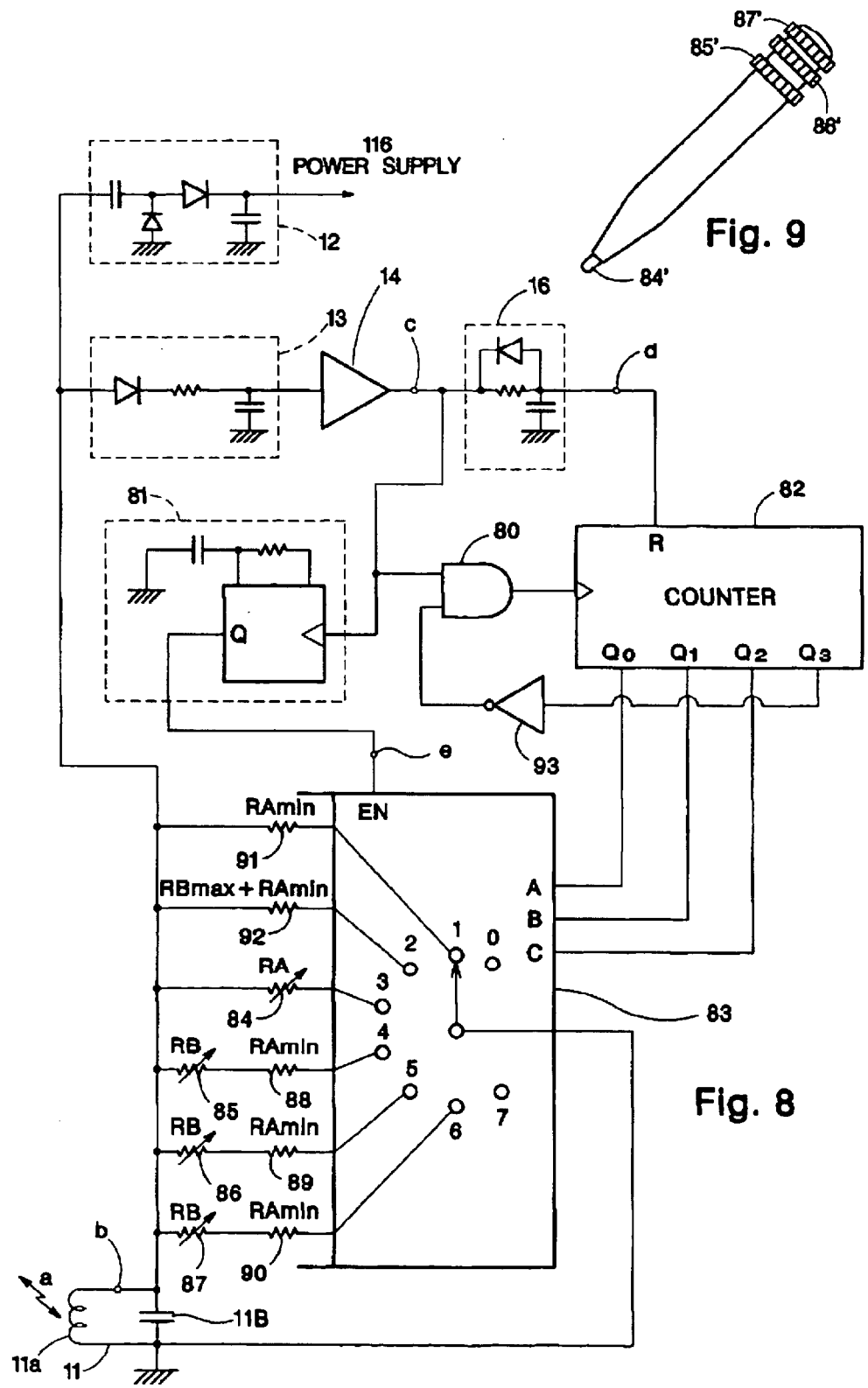

POSITION DETECTOR AND POSITION INDICATOR THEREFOR

BACKGROUND OF THE INVENTION

1. Field of the Invention

The present invention relates to position detectors and position indicators therefor for use in inputting graphics and characters to computers.

2. Description of the Related Art

One type of known position detector is disclosed in Japanese Unexamined Patent Application Publication No. Kokai Hei 1-53223 (earlier patent application 1)(U.S. Pat. No. 5,134,689).

In this position detector, a position indicator is provided with a resonant circuit containing a coil and a capacitor. Electromagnetic waves are transmitted between a tablet and the position indicator, whereby coordinate values of a position indicated by the position indicator are detected. Of a plurality of loop coils which are provided in the tablet and which are parallel to position detecting directions, the loop coils are sequentially selected, and the selected loop coil emits electromagnetic waves. The electromagnetic waves which are reemitted from the resonant circuit in the position indicator are received, and coordinate values of the position indicated are thereby detected on the basis of a distribution of reception signal strengths.

In this type of position detector, there are demands for inputting, in addition to the coordinate values of the position indicated, information which indicates the state in which the position indicated (which should be actually input) is specified. Examples of such information include information for continuously varying the line thickness, hue, and luminance.

In the earlier patent application 1, the coil which forms the resonant circuit is a coil whose inductance continuously varies in accordance with the writing force. Thus, the resonance frequency continuously varies in accordance with the writing force. A continuous variation in the resonance frequency is detected as a continuous variation in phase angle, and the writing force is detected thereby.

The range of phase angles, which corresponds to the range of writing forces to be detected, varies as a result of factors such as the distance from the tablet to the position indicator, the tilt of the position indicator with respect to the tablet, etc. Also, the range of phase angles (writing forces) varies in accordance with the aging of the inductance of the coil. It is thus impossible to accurately detect writing forces.

In Japanese Unexamined Patent Application Publication No. Kokai hei 7-225644 (earlier patent application 2), the applicant of the present invention has proposed a pen in which the writing force and the continuous quantities of the three RGB colors are set, thereby allowing information such as color hue and color strength to be input with the pen. More specifically, four variable capacitors are provided in order to set the writing force and the quantities of three colors. At four different times, the four variable capacitors are sequentially connected to the resonant circuit, whereby the four continuous quantities are independently detected.

With the foregoing pen, the phase of a signal when no variable capacitors are connected is detected beforehand, thereby suppressing effects caused by the aging of the coil inductance as in the earlier patent application 1. In contrast, as in the earlier patent application 1, the range of phase angles corresponding to the range of continuous quantities to be detected varies as a result of factors such as the distance from the pen to the tablet, the tilt of the pen with respect to the tablet, etc. It is thus impossible to obtain the correct continuous quantities.

The applicant of the present invention has proposed in Japanese Unexamined Patent Application Publication No. 5-313439 (earlier patent application 3)(U.S. Pat. No. 5,679,930) a position indicator which converts therein a continuous quantity into binary code and which transmits back the binary code to the tablet, thereby detecting the continuous quantity.

With this position indicator, an accurate continuous quantity can be detected while factors such as the height and tilt of the position indicator with respect to the tablet have no influence on the position indicator. In contrast, the structure of the position indicator becomes complex. The position indicator has another disadvantage in that the sampling rate decreases due to the necessity for repeating transmission/reception for each bit because a single continuous quantity is transmitted back in terms of binary code.

SUMMARY OF THE INVENTION

Accordingly, it is an object of the present invention to provide a position detector and a position indicator therefor for accurately detecting a continuous quantity in accordance with an operation, at a low cost, without causing the structure of the position indicator to become complex.

It is another object of the present invention to provide a position detector and a position indicator therefor for accurately detecting a continuous quantity in accordance with an operation at a fast sampling rate.

According to the present invention, the foregoing objects are achieved through provision of a position detector including a position indicator including a resonant circuit which includes at least a coil and a capacitor; and a tablet for transmitting/receiving electromagnetic waves to/from the position indicator, whereby coordinate values of a position indicated by the position indicator are detected. Electromagnetic waves which include predetermined timing information are generated by the tablet. The predetermined timing information is extracted from a dielectric voltage generated at the resonant circuit in the position indicator which has received the electromagnetic waves. A resonance characteristic of the resonant circuit in the position indicator is controlled in accordance with operations at specific times based on the predetermined timing information. The phase or strength of electromagnetic waves which are generated at the specific times by the resonant circuit in the position indicator is detected.

The position indicator further includes a first resonance characteristic control unit for causing the resonance characteristic of the resonant circuit at a first specific time based on the predetermined timing information to be a value within a predetermined variable range of the resonance characteristic in accordance with a continuous operation quantity; a second resonance characteristic control unit for causing the resonance characteristic of the resonant circuit at a second specific time based on the predetermined timing information to be a maximum within the predetermined variable range of the resonance characteristic; and a third resonance characteristic control unit for causing the resonance characteristic of the resonant circuit at a third specific time based on the predetermined timing information to be a minimum within the predetermined variable range of the resonance characteristic.

The tablet includes a detection value obtaining unit for obtaining the phase or strength of the electromagnetic waves generated by the resonant circuit in the position indicator at the first, second, and third specific times as first, second, and third detection values, respectively; and a processor for detecting a continuous operation quantity by relating the first detection value to a range from an upper limit to a lower limit, the upper limit being one of the second and third detection values and the lower limit being the other detection value.

According to the present invention, even when the level and phase of a signal vary because of the height and tilt of a position indicator, a continuous quantity in accordance with an operation can be accurately detected. Also, detection of a single continuous quantity and the maximum reference value and the minimum reference value of the continuous quantity can each be performed by one transmission/reception. As a result, a continuous quantity in accordance with an operation can be accurately detected at a high sampling rate.

One aspect of the present invention comprises a stylus for use with a sensor where the stylus includes a resonant circuit having a resonance characteristic with a variable value that is affected by a condition of the stylus. The variable value is a first value when the condition of the stylus is at a maximum level and a second value when the condition of the stylus is at a minimum level. The stylus also includes a first resonance control circuit for causing the resonance characteristic to be the first value and a second resonance control circuit for causing the resonance characteristic to be the second value. The condition of the stylus is then determined by detecting the variable value, the first value, and the second value.

Another aspect of the invention comprises a method of determining a level of a condition of a stylus that requires providing a resonant circuit in a stylus that has a resonance characteristic with a variable value that is affected by the condition of the stylus. The condition has a minimum level and a maximum level, and the resonance characteristic has a first value when the level of the condition of the stylus is at the maximum level and a second value when the level of the condition of the stylus is at the minimum level. A first resonance control circuit is also provided for causing the variable value to be the first value and a second resonance control circuit is provided for causing the variable value to be the second value. The variable value, first value and second value are detected, and the level of the condition is calculated by comparing the variable value to the first value and the second value.

A further aspect of the invention comprises a method of determining a level of pressure applied to a tip of a stylus where the stylus has a resonant circuit with a resonance characteristic having a variable value affected by pressure applied to the tip of the stylus. The pressure can vary between a minimum level and a maximum level, and the resonance characteristic has a first value when the level of the pressure is at the maximum level and a second value when the level of the pressure is at the minimum level. A first resonance control circuit is used to cause the variable value to be the first value, and a second a second resonance control circuit is used to cause the variable value to be the second value. The variable value, the first value and the second value are determined, and the level of pressure is calculated by comparing the variable value to the first value and the second value.

BRIEF DESCRIPTION OF THE DRAWINGS

FIG. 8 is a circuit diagram of a position indicator according to a third embodiment of the present invention;

FIG. 9 is an external view of the position indicator according to the third embodiment of the present invention.

DESCRIPTION OF THE PREFERRED EMBODIMENTS

First Embodiment
Structure of First Embodiment

Figure 1:
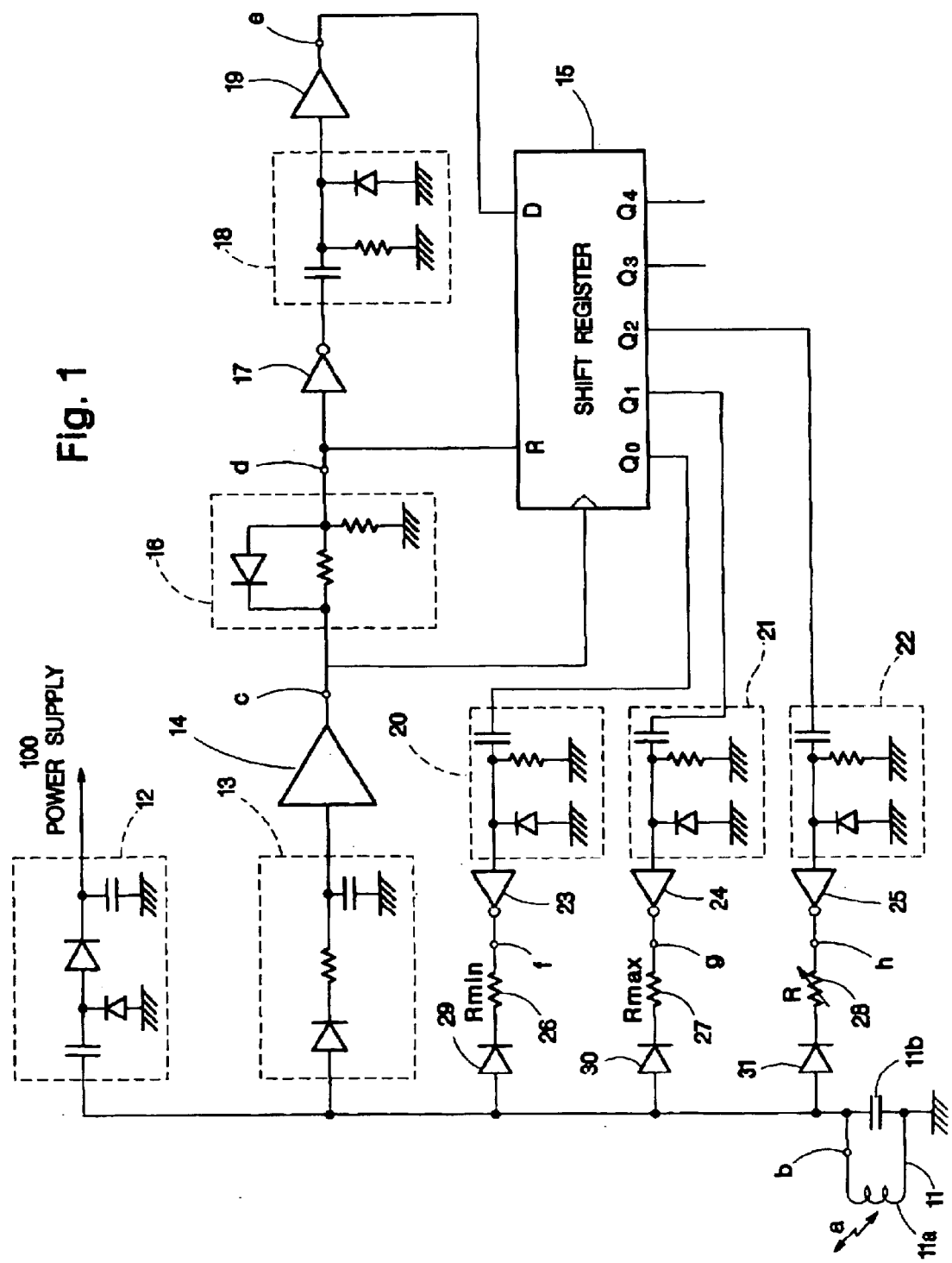
FIG. 1 is a circuit diagram of a position indicator according to a first embodiment of the present invention.

FIG. 1 shows the structure of a position indicator according to a first embodiment of the present invention.

Referring to FIG. 1, a coil 11a and a capacitor 11b form a resonant circuit 11 which resonates at a predetermined frequency $f_o$. A power supply circuit 12 extracts power from a high-frequency voltage generated at the resonant circuit 11.

A detector circuit 13 detects timing in accordance with transmission/reception based on a signal (b) generated at the resonant circuit 11. An output port of the detector circuit 13 is connected to a comparator 14. The comparator 14 extracts a clock signal (c) which corresponds to transmission/reception of electromagnetic waves by a tablet. The clock signal (c) is connected to a clock input terminal of a shift register 15.

The clock signal (c) is also connected to an integrating circuit 16, and the integrating circuit 16 generates a signal (d) which generates a voltage only in a continuous transmission period (described below). The signal (d) is supplied to a reset terminal of the shift register 15. The signal (d) passes through an inverter 17, a differentiating circuit 18, and a comparator 19, thereby generating a signal (e) which is outputted at a high level only in a period from the end of the continuous transmission to the end of the subsequent transmission. The signal (e) is connected to a data input terminal of the shift register 15.

Three outputs (Q0 to Q2) of the shift register 15 are connected to differentiating circuits 20, 21, 22, respectively, all of which have the same time constant. The differentiating circuits 20, 21, and 22 are connected to inverters 23, 24, 25, respectively.

A variable resistor 28 formed of pressure-sensitive conductive rubber or the like is connected to the inverter 25. The variable resistor 28 is connected to the resonant circuit 11 through a diode 31.

The resistance of the variable resistor 28 varies in accordance with a pressure. In the first embodiment, the variable resistor 28 is employed to detect a writing force applied with a pen. The range of writing forces to be detected is from 0 g to 500 g. Under a load within this range, the resistance of the variable resistor 28 varies within the range of Rmax to Rmin.

A resistor 27 which has the same resistance as the maximum resistance Rmax available to the variable resistor 28 is connected to the inverter 24. The resistor 27 is connected to the resonant circuit 11 through a diode 30. A resistor 26 which has the same resistance as the minimum resistance Rmin available to the variable resistor 28 is connected to the inverter 23. The resistor 26 is connected to the resonant circuit 11 through a diode 29.

Figure 2:
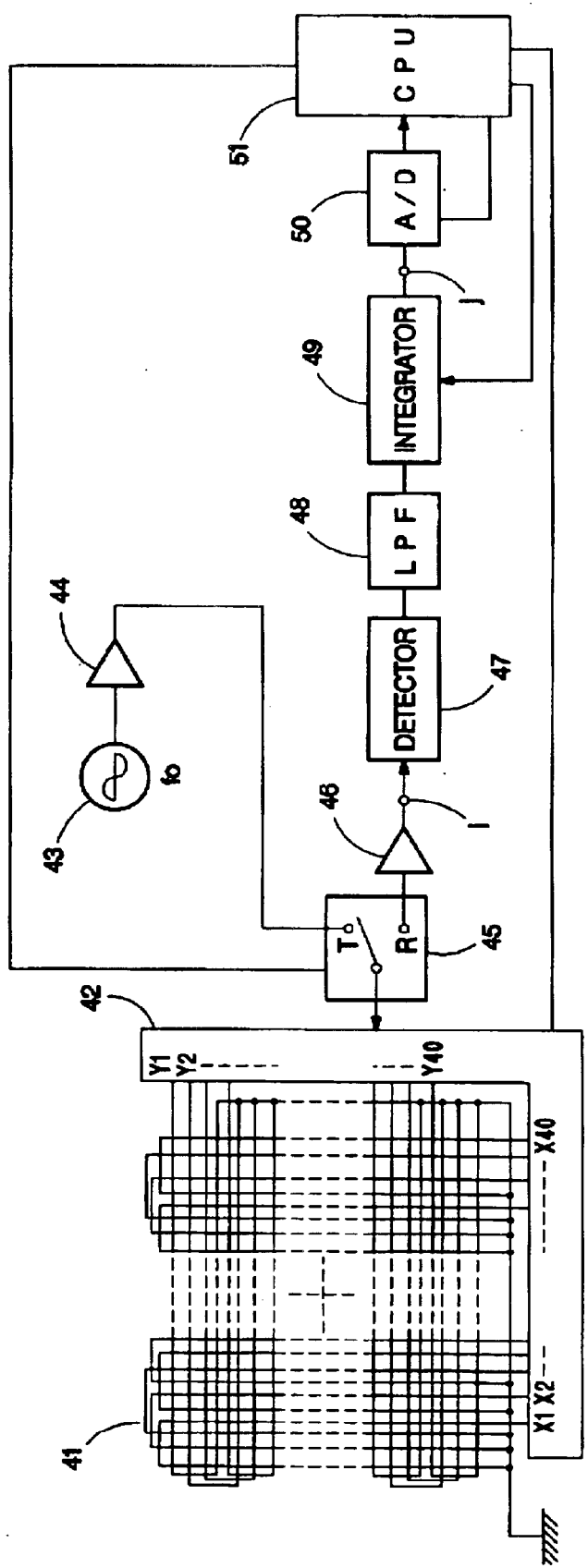
FIG. 2 is a block diagram of a tablet according to the first embodiment of the present invention.

FIG. 2 shows portions of a position detector, excluding the position indicator, according to the first embodiment of the present invention. The structure of the tablet according to the first embodiment of the present invention is illustrated in FIG. 2.

Referring to FIG. 2, a group of loop coils 41 consisting of X1 to X40 and Y1 to Y40 is provided in the X-axis direction and the Y-axis direction, respectively. These loop coils 41 are connected to a selector circuit 42 which selects the loop coils 41 one at a time.

An oscillation circuit 43 oscillates at the same frequency as the resonant frequency $f_o$ of the position indicator. The oscillation circuit 43 is connected at a transmitting side (T) of a transmission/reception switching circuit 45 through a electric current driver 44. The transmission/reception switching circuit 45 is connected to the selector circuit 42, and electromagnetic waves at the frequency $f_o$ are radiated from a selected loop coil towards the position indicator.

A receiving side (R) of the transmission/reception switching circuit 45 is connected to an amplifier circuit 46, and the amplifier circuit 46 is connected to a detector circuit 47. The detector circuit 47 is connected to a low pass filter 48, and the low pass filter 48 is connected to an integrating amplifier 49. The integrating amplifier 49 stores and holds a reception signal for a predetermined period of time. The voltage stored by the integrating amplifier 49 is output to an AD converter circuit 50, and an output of the AD converter circuit 50 is connected to a CPU 51.

The CPU 51 transmits control signals (information) to the selector circuit 42, the transmission/reception switching circuit 45, the integrating amplifier 49, and the AD converter circuit 50.

Operation of First Embodiment

Referring to FIGS. 1 and 2, the operation of the first embodiment will now be described.

In the first embodiment, as in a known position indicator, overall scanning is performed to roughly detect the position at which the position indicator is placed on a position detecting surface formed by the group of loop coils 41.

Figure 4:
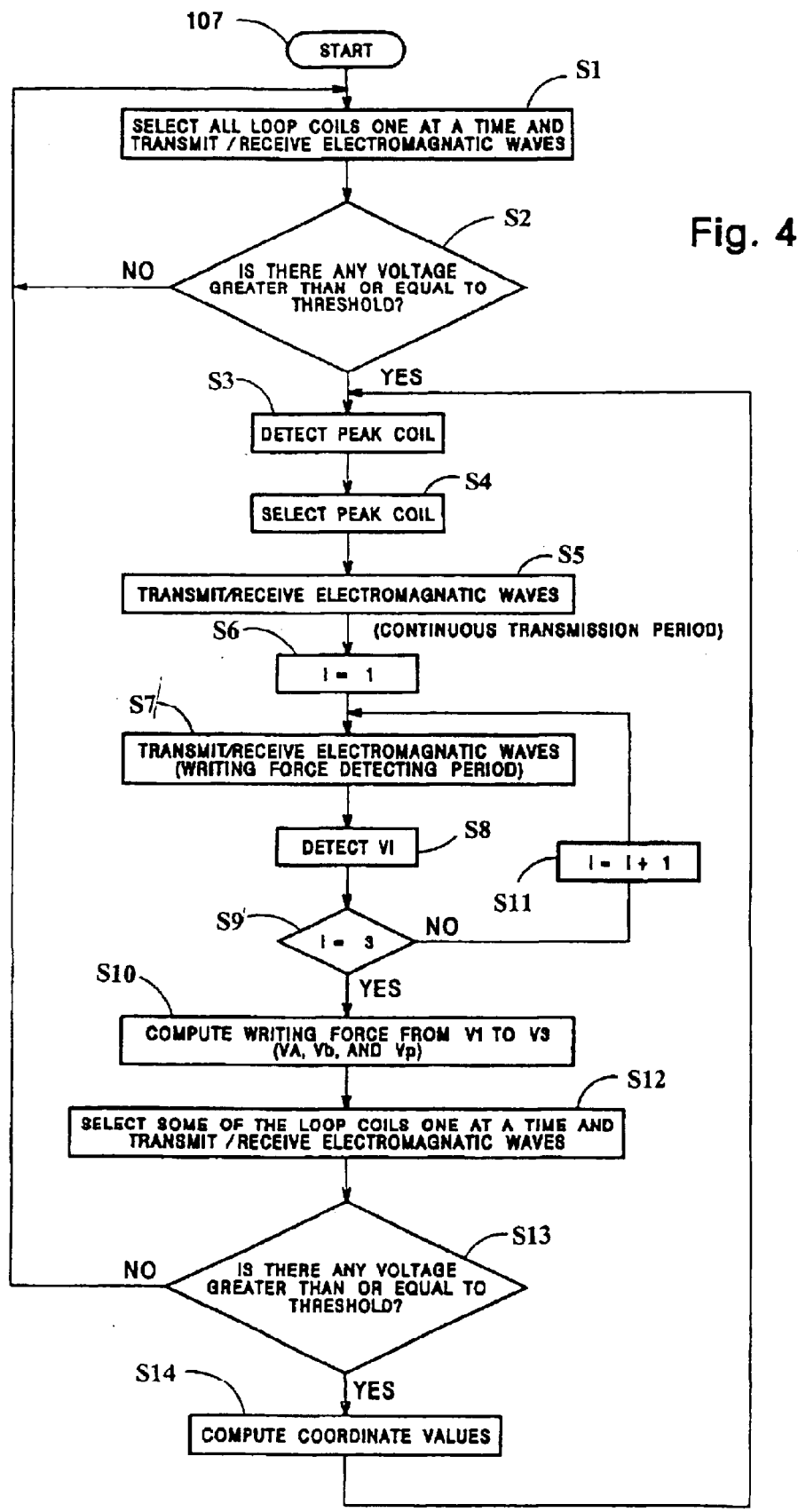
FIG. 4 is a flowchart showing a process of detecting a position in the first embodiment.

Referring to FIG. 4, overall scanning is performed in the following manner: After the process is started at 107, all of the forty loop coils in the X-axis direction and the Y-axis direction are selected one at a time, and electromagnetic waves are transmitted/received at S1. It is checked whether a signal level greater than or equal to a predetermined value is received at S2. A loop coil which generates a signal with the highest signal level (hereinafter referred to as a peak coil) is detected at S3.

The operation subsequent to detecting the approximate position of the position indicator by the foregoing overall canning will now be described. In the first embodiment, a case in which the position indicator is placed near the intersection of the loop coils X7 and Y5 is used for explanation.

Figure 3:
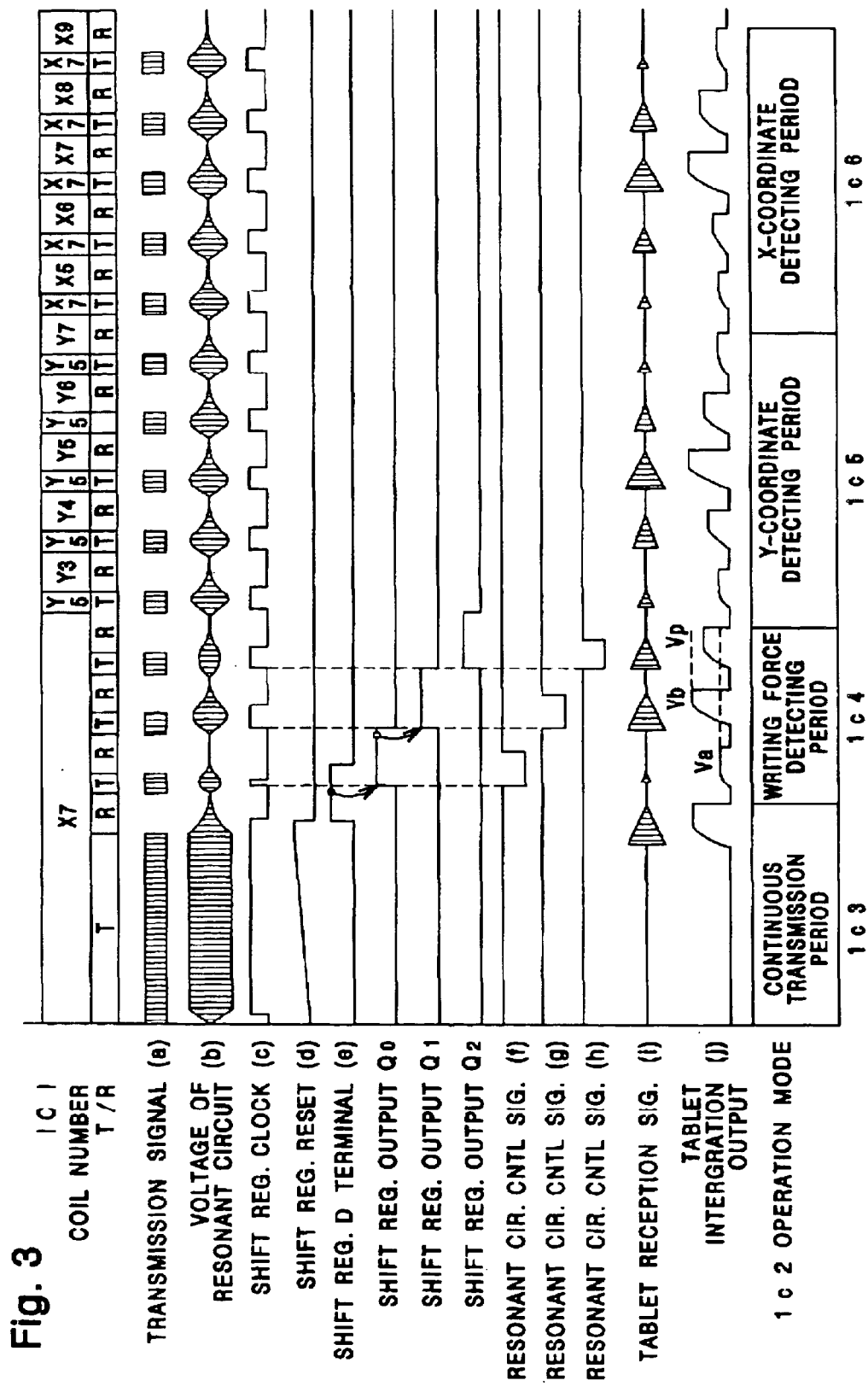
FIG. 3 includes waveform diagrams showing the operation of the first embodiment of the present invention.

FIG. 3 includes schematic waveform diagrams showing the operation of portions after the approximate position of the position indicator has been detected. Referring to FIG. 3, traces (a) to (j) show waveforms of portions denoted by the same reference symbols in FIGS. 1 and 2.

Referring to FIGS. 3 and 4, the CPU 51 applies a control signal to the selector circuit 42 so that the selector circuit 42 selects the loop coil X7 (peak coil) at S4 and a control signal to the transmission/reception switching circuit 45 so that the transmission/reception witching circuit 45 is switched to the transmitting side (T). The loop coil X7 emits electromagnetic waves at the frequency $f_o$ at S5. The emission of electromagnetic waves is continued for a relatively long period of time (continuous transmission period ) such as 1 mS at S6. Subsequently, the CPU 51 applies a control signal to the transmission/reception switching circuit 45 so that the transmission/reception switching circuit 45 is switched to the receiving side (R) at S7.

After the transmission of the electromagnetic waves ends, the signal remains in the resonant circuit 11 for a while. Therefore, the tablet detects this signal as the signal (i) at S8. A receiving period for receiving the signal (i) is continued for a period in which the signal in the resonant circuit 11 is sufficiently attenuated (such as 100 $\mu$S)

When the receiving period subsequent to the continuous transmission ends, a relatively brief transmission period (such as 50 $\mu$S) and a receiving period (such as 100 $\mu$S) are each repeated three times in order to detect a writing force applied to the variable resistor 28 at S9 and S11.

In the first transmission/reception, as shown in FIG. 3, the terminal Q0 of the shift register 15 rises to the high level. Thus, the signal f becomes the low level at the rising edge and remains the low level for a period determined by the time constant of the differentiating circuit 20. In the meantime, the signal b at both ends of the resonant circuit 11 is attenuated by the diode 29 and the resistor 26.

Similarly, in the second transmission/reception, the signal b at both ends of the resonant circuit 11 is attenuated by the diode 30 and the resistor 27.

Similarly, in the third transmission/reception, the signal b at both ends of the resonant circuit 11 is attenuated by the diode 31 and the variable resistor 28.

The strengths of the signals received by the tablet for the first to third times correspond to the values of the resistors 26 and 27 and the variable resistor 28, respectively. In these three periods, the levels of integration outputs j are denoted by Va, Vb, and Vp, respectively, at S10. As shown in FIG. 3, Va is lower than Vb, and Vp is between Va and Vb. Specifically, when a load applied by the writing force is zero, then Vp=Vb. Under the maximum load (500 g), Vp=Va. By computing the level of Vp between Va and Vb based on proportions, the writing force value within the range of loads to be detected can be accurately computed. This operation Constitutes a feature of the present invention.

When the writing force detecting period ends, the CPU 51 performs partial scanning at S12 to detect the Y-coordinate value and the X-coordinate value. This operation is performed in a manner similar to a known position indicator. It is determined if there is any voltage greater than or equal to the threshold at S13. The coordinate value, are then computed at S14.

FIG. 4 shows a process of detecting a position in the first embodiment. Referring to FIG. 4, the number of times electromagnetic wave transmissions/receptions are performed in the writing force detecting period is indicated by i. Specifically, V1=Va, V2=Vb, and V3=Vp.

Extended First Embodiment

Although a variable resistor formed of pressure-sensitive conductive rubber has been used to detect a continuous quantity, the present invention can be implemented by other methods.

When a load of 0 g is applied to the variable resistor 28, the resistance of the variable resistor 28 becomes substantially maximum. In such a case, the differentiating circuit 21, the inverter 24, the resistor 27, and the diode 30 in the position indicator, and the second transmission/reception during the writing force detecting period can be omitted, and the reception level immediately after the continuous transmission can be used as Vb.

Second Embodiment

Structure of Second Embodiment

Figure 5:
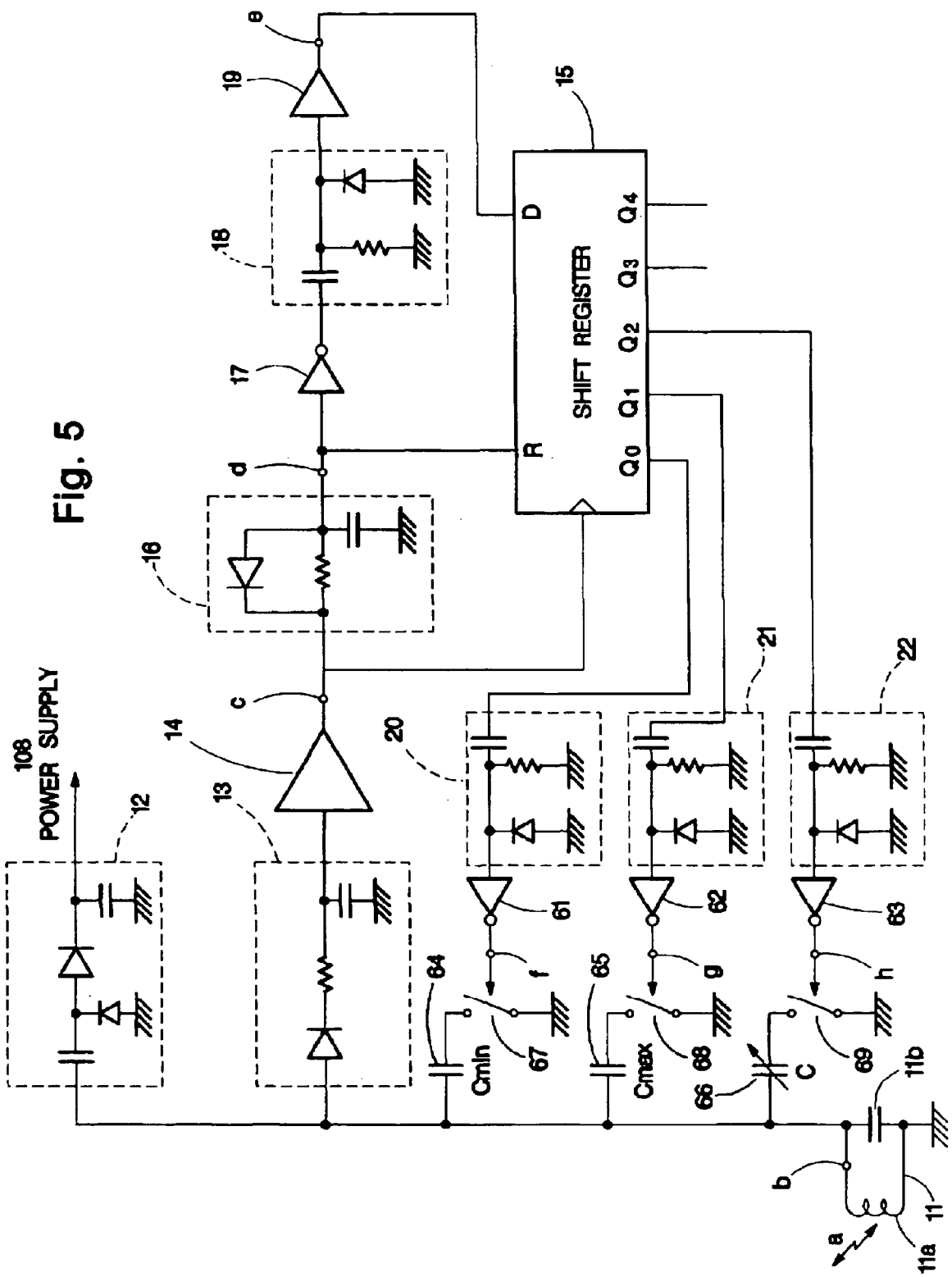
FIG. 5 is a circuit diagram of a position indicator according to a second embodiment of the present invention.

FIG. 5 shows the structure of a position indicator according to a second embodiment of the present invention. Referring to FIG. 5, the same reference numerals are given to components corresponding to those in the first embodiment. The structure shown in FIG. 5 differs from that of the first embodiment (FIG. 1) in the circuit configuration among the differentiating circuits 20, 21, and 22 and the resonant circuit 11.

Referring to FIG. 5, the differentiating circuits 20, 21, and 22 are connected to comparators 61, 62, and 63, respectively. The comparators 61, 62, and 63 are connected to analog switches 67, 68, and 69, respectively.

The capacitance of a variable capacitor 66 varies in accordance with a writing force. The variable capacitor 66 is connected in parallel to the resonant circuit 11 through the analog switch 69. It is assumed that a writing force to be detected ranges from 0 g to 500 g and that, within this range of loads, the electrostatic capacitance of the variable capacitor 66 varies within the range of Cmin to Cmax.

A capacitor 64 has the same capacitance as the minimum capacitance Cmin available to the variable capacitor 66. The capacitor 64 is connected in parallel to the resonant circuit 11 through the analog switch 67. A capacitor 65 has the same capacitance as the maximum capacitance Cmax available to the resonant capacitor 66. The capacitor 65 is connected in parallel to the resonant circuit 11 through the analog switch 68.

Figure 6:
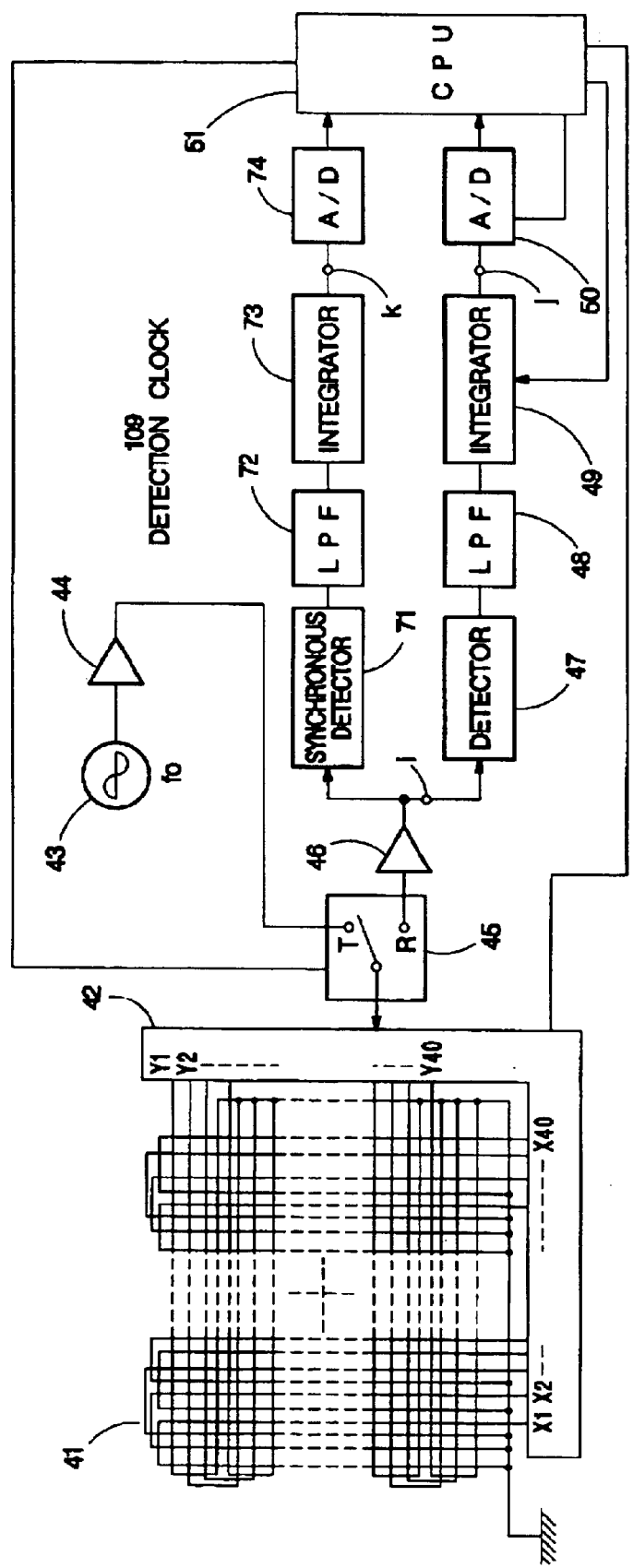
FIG. 6 is a block diagram of a position detector according to the second embodiment of the present invention.

FIG. 6 shows the structure of a tablet according to the second embodiment of the present invention. The same reference numerals are given to components corresponding to those in the first embodiment. The structure shown in FIG. 6 differs from that of the first embodiment (FIG. 2) in that a second receiving system is provided to detect the phase of a signal which returns from the position indicator and to detect a wiring force.

Referring to FIG. 6, a synchronous detector 71 is connected to the amplifier circuit 46. The oscillation circuit 43 is connected to the synchronous detector 71 and supplies a clock which is used as a reference for phase detection. The synchronous detector 71 is connected to a low pass filter 72, and the low pass filter 72 is connected to an integrating amplifier 73. The integrating amplifier 73 stores and holds a reception signal for a predetermined period of time. The voltage held by the integrating amplifier 73 is output to an AD converter circuit 74, and an output of the AD converter circuit 74 is connected to the CPU 51.

Operation of Second Embodiment

Referring to FIGS. 5 and 6, the operation of the second embodiment will now be described.

As in the first embodiment, in the second embodiment, overall scanning is performed to detect an approximate position at which the position indicator is placed on the position detecting surface formed by the group of loop coils 41.

The operation subsequent to detecting the approximate position of the position detector by overall scanning will now be described. A case in which the position indicator is placed at the intersection of the loop coils X7 and Y5 is used for explanation.

Figure 7:
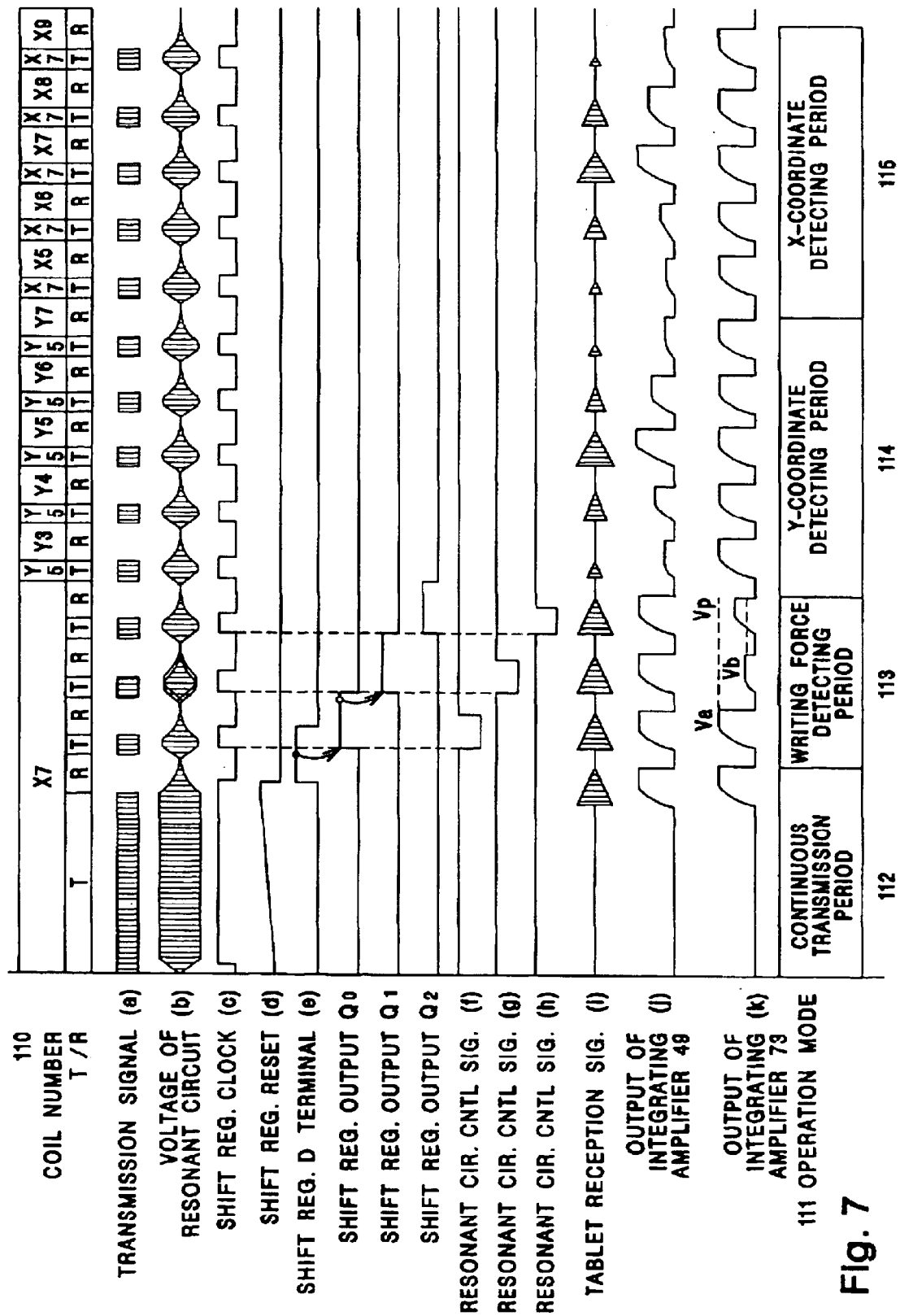
FIG. 7 includes waveform diagrams showing the operation of the second embodiment of the present invention.

FIG. 7 includes schematic waveform diagrams showing the operation of portions after the approximate position of the position indicator has been detected. Referring to FIG. 7, traces (a) to (k) show waveforms of portions denoted by the same reference symbols in FIGS. 5 and 6.

As shown in FIG. 7, the second embodiment is similar to the first embodiment in that the writing force detecting period, Y-coordinate detecting period, and X-coordinate detecting period are repeated subsequent to the continuous transmission period. Also, the signals a to j are substantially the same as those in the first embodiment. In contrast, the second embodiment differs form the first embodiment in that the level of the integration output (j) in the writing force detecting period does not vary whereas the level of the integration output (k) by the signal from the synchronous detector 71 varies.

Referring to FIG. 7, when the continuous transmission and the subsequent reception period end, a relatively brief transmission period (for example, 50 $\mu$S) and a reception period (for example, 100 $\mu$S) are each repeated three times in order to detect a writing force applied to the variable capacitor 66.

In the first transmission/reception, the signal f becomes the high level, and the analog switch 67 is turned ON. As a result, the capacitor 64 is connected to the resonant circuit 11, thereby slightly changing the resonant frequency of the resonant circuit 11. The synchronous detector 71 detects a variation in frequency of a signal returning from the resonant circuit 11 and uses this frequency shift as a phase shift. In response, the integrating amplifier 73 outputs the signal k at a level in accordance with the phase.

Similarly, in the second transmission/reception, the capacitor 65 is connected to the resonant circuit 11, and the signal k in accordance with the electrostatic capacitance of the capacitor 65 is output.

Similarly, in the third transmission/reception, the variable capacitor 66 is connected to the resonant circuit 11, and the signal k in accordance with the writing force at that time is output.

The strengths of the signals k output from the integrating amplifier 73 for the first to third times correspond to the values of the capacitors 64 and 65 and the variable capacitor 66, respectively. If the strengths of the signals k are denoted by Va, Vb, and Vp, respectively, as shown in FIG. 6, Vp is within Va and Vb. Specifically, when a load applied by the writing force is zero, then Vp=Va. Under the maximum load (500 g), Vp=Vb. By computing the level of Vp between Va and Vb based on proportions, the writing force value within the range of loads to be detected can be accurately computed. This operation constitutes a feature of the present invention.

When the writing force detecting period ends, as in the first embodiment, the CPU 51 performs an operation to detect the Y-coordinate value and the X-coordinate value.

The process of detecting a position in the second embodiment is basically the same as that in the first embodiment.

Extended Second Embodiment

Although analog switches are used to connect the capacitors 64 and 65 and the variable capacitor 66 to the resonant circuit 11, the capacitors 64 and 65 and the variable capacitor 66 can be connected to the resonant circuit 11 through diodes instead, as in the first embodiment.

Although the output value of the integrating amplifier 73 decreases as the electrostatic capacitance of the variable capacitor 66 increases, the synchronous detector 71 can be configured in order that this relationship can be reversed.

Third Embodiment

Structure of Third Embodiment

FIG. 8 shows the structure of a position indicator according to a third embodiment of the present invention. Referring to FIG. 8, the same reference numerals are given to components corresponding to those in the first embodiment.

Referring to FIG. 8, the coil 11a and the capacitor 11b form the resonant circuit 11 which resonates at the predetermined frequency $f_o$. The power supply circuit 12 extracts power from the high-frequency voltage generated at the resonant circuit 11.

The detector circuit 13 detects timing in accordance with transmission/reception based on the signal (b) generated at the resonant circuit 11. The output port of the detector circuit 13 is connected to the comparator 14. The comparator 14 extracts the clock signal (c) which corresponds to transmission/reception of electromagnetic waves by the tablet.

The clock signal (c) is connected to the integrating circuit 16, and the integrating circuit 16 generates the signal (d) which generates a voltage only in the continuous transmission period (described below). The clock signal (c) is also connected to a first input port of an AND gate 80 and to a one-shot monostable multivibrator circuit 81.

An output port of the AND gate 80 is connected to a clock input terminal of a counter circuit 82. An output of the integrating circuit 16 is connected to a reset terminal of the counter circuit 82. Output terminals Q0 to Q2 for three lower bits to be output from the counter circuit 82 are connected to select terminals of an analog multiplexer 83. An output terminal Q3 of the counter circuit 82 is connected to a second input port of the AND gate 80 through an inverter 93.

An output port of the one-shot monostable multivibrator circuit 81 is connected to an enable terminal of the analog multiplexer 83. A common terminal of the analog multiplexer 83 is connected to the resonant circuit 11 at the ground side. In accordance with the three-bit input signal value Q0 to Q2, resistors and variable resistors are selected and the selected resistors are thus connected to the resonant circuit 11. When the three-bit input signal value Q0 to Q2 is (000) or (111), no resistors are connected to the resonant circuit 11.

The resistance of each of variable resistors 84 to 87 varies in accordance with the operation. Resistors 88 and 92 are also provided.

FIG. 9 shows the external view of the position indicator according to the third embodiment of the present invention. The position indicator is operated to input a writing force and three types of analog quantities. Referring to FIG. 9, the resistance of the variable resistor 84 varies in accordance with a load applied to a writing force detector 84'. Dials 85', 86', and 87' are operated to change the resistances of the variable resistors 85, 86, and 87, respectively.

In the third embodiment, three dials 85', 86', and 87' are provided so that the allocation of the three primary colors (red, blue, and green) can be set. Thus, the position indicator can be used as an electronic pen capable of inputting a writing force and hue.

A load applied to the writing force detector 84' is detected within the range of, for example, 0 to 500 g. When no load is applied, the resistance of the variable resistor 84 becomes infinite. With application of 500 g load, the resistance of the variable resistor 84 becomes RAmin.

The resistances of the variable resistors 85 to 87 are changed by operating the dials 85' to 87', respectively.

The resistances of the resistors 88 to 91 are the same as minimum resistance RAmin of the variable resistor 84. The resistance of the resistor 92 is the sum of the minimum resistance RAmin of the variable resistor 84 and the maximum resistance RBmax of the variable resistors 85 to 87, that is, RAmin+RBmax.

Alternatively, the tablet for use in connection with the position indicator of the third embodiment can be structured as shown in FIG. 2.

Operation of Third Embodiment

Referring to FIG. 8 which shows the position indicator and to FIG. 2 which shows the tablet used therefor, the operation of the position indicator is described.

In the third embodiment as in the first and second embodiments, overall scanning is performed to roughly detect the position at which the position indicator is placed on the position detecting surface formed by the group of loop coils 41.

The operation after detecting the approximate position of the position indicator by overall scanning will now be described. In the third embodiment, a case in which the position indicator is placed near the intersection of the loop coils X7 and Y5 is used for explanation.

Figure 10:
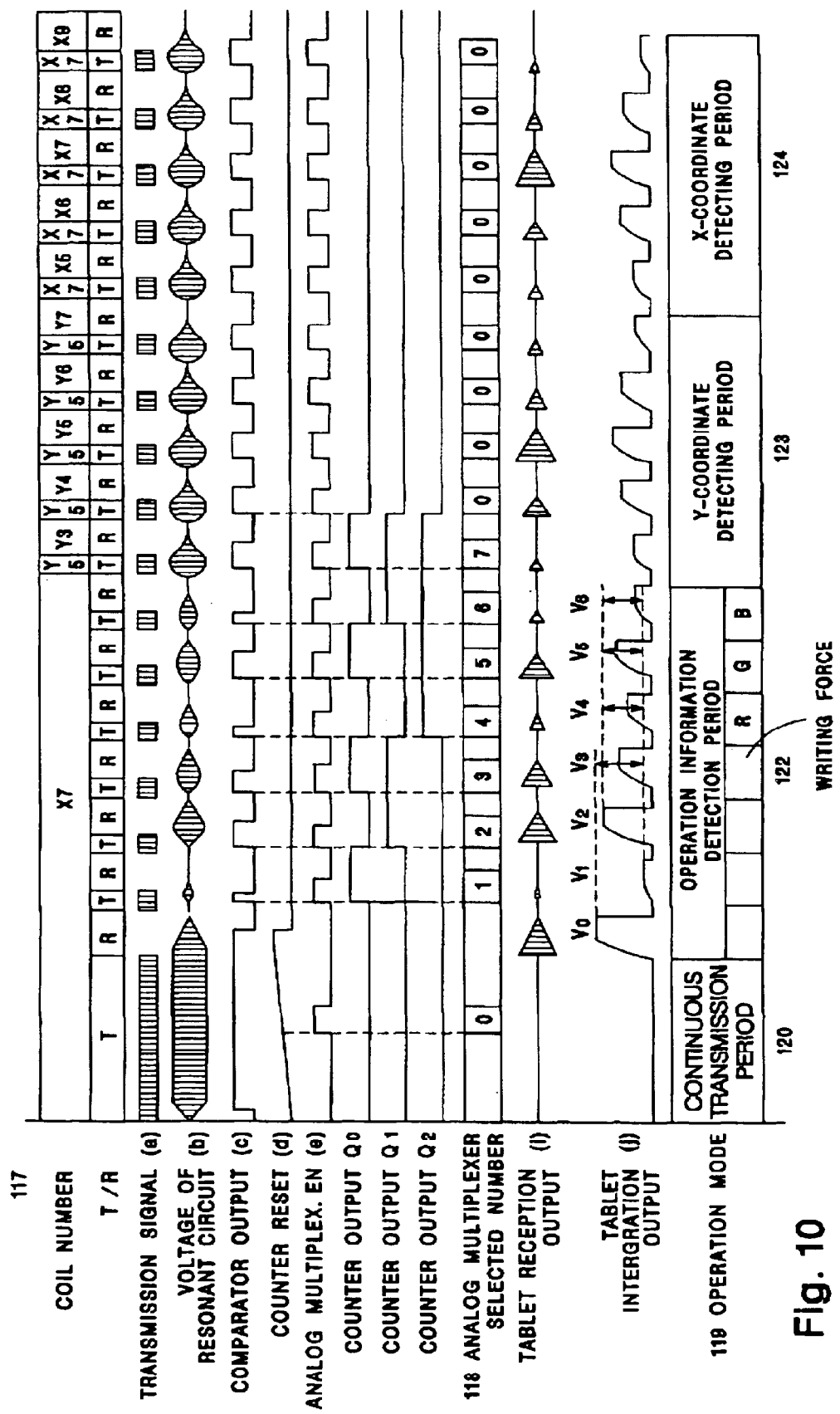
FIG. 10 includes waveform diagrams showing the operation of the third embodiment of the present invention.

FIG. 10 includes schematic waveform diagrams showing the operation of portions after the approximate position of the position indicator has been detected. Referring to FIG. 10, traces a to j indicate the waveforms at the portions denoted by the same reference symbols in FIGS. 8 and 2.

The CPU 51 applies a control signal to the selector circuit 42 so that the selector circuit 42 selects the loop coil X7 and a control signal to the transmission/reception switching circuit 45 so that the reception/transmission switching circuit 45 is switched to the transmitting side (T). In response, the loop coil X7 emits electromagnetic waves at the frequency $f_o$. The emission of electromagnetic waves is continued for a relatively long period of time (continuous transmission period) such as 1 mS. Subsequently, the CPU 51 applies a control signal to the transmission/reception switching circuit 45 so that the transmission/reception switching circuit 45 is switched to the receiving side (R).

Since a signal remains in the resonant circuit 11 for some time after the electromagnetic wave transmission has ended, the tablet detects this signal as the signal (i). The reception period is continued for a period in which the signal in the resonant circuit 11 is sufficiently attenuated (such as 100 $\mu$S). Signal level V0 detected at this time is a value in a state in which no resistors are connected to the resonant circuit 11.

When the reception period subsequent to the continuous transmission ends, a relatively brief transmission period (such as 50 $\mu$S) and a reception period (such as 100 $\mu$S) are each repeated six times in order to detect the load applied to the writing force detector 84' and the preset values of the dials 85' to 87'.

In the first transmission/reception, as shown in FIG. 10, the analog multiplexer 83 selects the first terminal, and hence the resistor 91 is connected to the resonant circuit 11. Thus, signal level V1 detected by the tablet in this period is a value which corresponds to the resistance RAmin.

In the second transmission/reception, the analog multiplexer 83 selects the second terminal, and hence the resistor 92 is connected to the resonant circuit 11. Thus, signal level V2 detected by the tablet in this period is a value which corresponds to the sum of the resistances RBmax and RAmin.

In the third transmission/reception, the analog multiplexer 83 selects the third terminal, and hence the variable resistor 84 is connected to the resonant circuit 11. Thus, signal level V3 detected by the tablet in this period is a value which corresponds to the preset value of the variable resistor 84.

This value indicates the load applied to the writing force detector 84'. The load varies within the range of V0 to V1, which has already been determined within the range of 0 to 500 g. Even when signal level V3 at this time varies because of the height and tilt of the position indicator, V0 and V1 also vary in accordance with the variation in signal level V3. By computation based on proportions, the more accurate load value can be detected. This operation constitutes a feature of the present invention.

The computation can be performed by the following equation:

$$load = (V0 - V3) \times 500 \, (g) / (V0 - V1)$$

In the fourth transmission/reception, the analog multiplexer 83 selects the fourth terminal, and hence the variable resistors 85 and 88 are connected to the resonant circuit 11. Thus, signal level V4 detected by the tablet in this period is a value which corresponds to the preset value of the variable resistor 85.

This value indicates the setting state of the dial 85'. Based on the setting, V4 varies within the range of V1 to V2. Even when signal level V4 varies because of the height and tilt of the position indicator, V1 and V2 also vary in accordance with the variation in signal level V4. By computation based on proportions, the setting state of the dial 85' can be reliably computed.

A case in which the dial 85' is used to input a red quantity (R) which can vary within the range of 0 to 100 is used for explanation. The red quantity (R) can be computed by the following equation:

$$R = (V4 - V1) \times 100 / (V2 - V1)$$

Similarly, the preset values of the dials 86' and 87' can be computed by the following equations, respectively:

$$G = (V5 - V1) \times 100 / (V2 - V1)$$

$$B = (V6 - V1) \times 100 / (V2 - V1)$$

After the writing force detecting period ends, as in the first and second embodiments, the CPU 51 performs an operation to detect the Y-coordinate value and the X-coordinate value.

The foregoing process of detecting a position in the third embodiment is basically the same as that in the first embodiment except for the fact that signal detection is also performed in the continuous transmission period and that transmissions/receptions of electromagnetic waves are performed six times in an operation information detecting period (which corresponds to the writing force detecting period in the first embodiment).

Extended Third Embodiment

In the third embodiment, the resistors each having the resistance RAmin are connected in series with the variable resistors 85 to 87, respectively, and hence the reference value when the dial setting is minimum is commonly used as V1 which is the reference value for detecting the writing force. Alternatively, resistors having different resistances can be employed, and reference values can be computed at different times.

FIG. 1
- 100: power supply
- 15: shift register

FIG. 2
- 47: detector
- 49: integrator

FIG. 3
- 101: coil number
- transmission signal (a)
- voltage of resonant circuit (b)
- shift register clock (c)
- shift register reset (d)
- shift register D terminal (e)
- shift register output $Q_0$
- shift register output $Q_1$
- shift register output $Q_2$
- resonant circuit control signal (f)
- resonant circuit control signal (g)
- resonant circuit control signal (h)
- tablet reception signal (i)
- tablet integration output (j)
- 102: operation mode
- 103: continuous transmission period
- 104: writing force detecting period
- 105: Y-coordinate detecting period
- 106: X-coordinate detecting period FIG. 4
- 107: Start
- S1: Select all loop coils one at a time and transmit/receive electromagnetic waves
- S2: Is there any voltage greater than or equal to threshold?
- S3: Detect peak coil
- S4: Select peak coil
- S5: Transmit/receive electromagnetic waves (continuous transmission period)
- S6: i=1
- S7: Transmit/receive electromagnetic waves (writing force detecting period)
- S8: Detect Vi
- S9: i=3
- S10: Compute writing force from V1 to V3 (Va, Vb, and Vp)
- S11: i=i+1
- S12: Select some of the loop coils one at a time and transmit/receive electromagnetic waves
- S13: Is there any voltage greater than or equal to threshold?
- S14: Compute coordinate values FIG. 5
- 108: power supply
- 15: shift register FIG. 6
- 109: detection clock
- 71: synchronous detector
- 73: integrator
- 47: detector
- 49: integrator FIG. 7
- 110: coil number
- transmission signal (a)
- voltage of resonant circuit (b)
- shift register clock (c)
- shift register reset (d)
- shift register D terminal (e)

shift register output $Q_0$
shift register output $Q_1$
shift register output $Q_2$
resonant circuit control signal (f)
resonant circuit control signal (g)
resonant circuit control signal (h)
tablet reception signal (i)
output of integrating amplifier 49 (j)
output of integrating amplifier 73 (k)
111: operation mode
112: continuous transmission period
113: writing force detecting period
114: Y-coordinate detecting period
115: X-coordinate detecting period FIG. 8
116: power supply
82: counter

FIG. 9

FIG. 10
117: coil number
transmission signal (a)
voltage of resonant circuit (b)
comparator output (c)
counter reset (d)
analog multiplexer EN (e)
counter output $Q_0$
counter output $Q_1$
counter output $Q_2$
118: analog multiplexer selected number
tablet reception signal (i)
tablet integration output (j)
119: operation mode
120: continuous transmission period
121: operation information detecting period
122: writing force
123: Y-coordinate detecting period
124: X-coordinate detecting period

What is claimed is:

1. A position detector comprising:
a position indicator comprising a resonant circuit comprising at least a coil and a capacitor; and
a tablet for transmitting/receiving electromagnetic waves to/from the position indicator, whereby coordinate values of a position indicated by the position indicator are detected;
wherein electromagnetic waves which include predetermined timing information are generated by the tablet; the predetermined timing information is extracted from a dielectric voltage generated at the resonant circuit in the position indicator which has received the electromagnetic waves; a resonance characteristic of the resonant circuit in the position indicator is controlled in accordance with operations at specific times based on the predetermined timing information; and the phase or strength of electromagnetic waves which are generated at the specific times by the resonant circuit in the position indicator is detected;
the position indicator further comprises:
first resonance characteristic control means for causing the resonance characteristic of the resonant circuit at a first specific time based on the predetermined timing information to be a value within a predetermined variable range of the resonance characteristic in accordance with a continuous operation quantity;
second resonance characteristic control means for causing the resonance characteristic of the resonant circuit at a second specific time based on the predetermined timing information to be a maximum within the predetermined variable range of the resonance characteristic; and
third resonance characteristic control means for causing the resonance characteristic of the resonant circuit at a third specific time based on the predetermined timing information to be a minimum within the predetermined variable range of the resonance characteristic; and
the tablet comprises:
detection value obtaining means for obtaining the phase or strength of the electromagnetic waves generated by the resonant circuit in the position indicator at the first, second, and third specific times as first, second, and third detection values, respectively; and
processing means for detecting a continuous operation quantity by relating the first detection value to a range from an upper limit to a lower limit, the upper limit being one of the second and third detection values and the lower limit being the other detection value.

2. A position indicator comprising:
a resonant circuit comprising at least a coil and a capacitor, wherein a dielectric voltage at the resonant circuit is generated by electromagnetic waves which are generated by a tablet and which include predetermined timing information, and the predetermined information is extracted from the dielectric voltage, whereby a resonance characteristic of the resonant circuit is controlled in accordance with operations at specific times based on the predetermined timing information;
first resonance characteristic control means for causing the resonance characteristic of the resonant circuit at a first specific time based on the predetermined timing information to be a value within a predetermined variable range of the resonance characteristic in accordance with a continuous operation quantity;
second resonance characteristic control means for causing the resonance characteristic of the resonant circuit at a second specific time based on the predetermined timing information to be a maximum within the predetermined variable range of the resonance characteristic; and
third resonance characteristic control means for causing the resonance characteristic of the resonant circuit at a third specific time based on the predetermined timing information to be a minimum of the predetermined variable range of the resonance characteristic.

3. The position indicator of claim 2 wherein said first resonance characteristic control means comprises a circuit including a variable resistor having a maximum resistance and a minimum resistance.

4. The position indicator of claim 3 wherein said second resonance characteristic control means comprises a circuit including a resistor having a resistance equal to the maximum resistance of said variable resistor.

5. The position indicator of claim 4 wherein said third resonance characteristic control means comprises a circuit including a resistor having a resistance equal to the minimum resistance of said variable resistor.

6. A stylus for use with a sensor comprising:
a resonant circuit having a resonance characteristic having a variable value affected by a condition of the stylus, said variable value being a first value when the condition of the stylus is at a maximum level and a second value when the condition of the stylus is at a minimum level, wherein the level of the condition of the stylus is equal to the difference between the first value and the variable value, divided by the difference between the maximum value and the minimum value, multiplied by the maximum level;
a first resonance control circuit for causing said resonance characteristic to be the first value; and
a second resonance control circuit for causing said resonance characteristic to be the second value;
whereby the condition of the stylus is determined by detecting the variable value, the first value, and the second value.

7. The stylus of claim 6 including a controller for controlling said first resonance control circuit and said second resonance control circuit.

8. A stylus for use with a sensor comprising:
a resonant circuit having a resonance characteristic having a variable value affected by a condition of the stylus, said variable value being a first value when the condition of the stylus is at a maximum level and a second value when the condition of the stylus is at a minimum level;
a variable resistor connected to said resonant circuit, said variable resistor having a maximum resistance when the condition is at a maximum level and a minimum resistance when said condition is at the minimum level;
a first resonance control circuit for causing said resonance characteristic to be the first value; and
a second resonance control circuit for causing said resonance characteristic to be the second value,
whereby the condition of the stylus is determined by detecting the variable value, the first value, and the second value.

9. The stylus of claim 8 wherein said first resonance control circuit includes a resistor having a resistance equal to the maximum resistance of the variable resistor.

10. The stylus of claim 9 wherein said second resonance control circuit includes a resistor having a resistance equal to the minimum resistance of the variable resistor.

11. The stylus of claim 10 wherein said variable resistor, said first resonance control circuit resistor and said second resonance control circuit resistor are connected in parallel.

12. The stylus of claim 6 wherein said resonant circuit comprises a coil and a capacitor.

13. The stylus of claim 6 wherein said condition is an amount of pressure applied to a tip of the stylus.

14. The stylus of claim 6 wherein said condition of the stylus comprises an amount of pressure exerted against a tip of said stylus.

15. A method of determining a level of a condition of a stylus comprising the steps of:
providing in a stylus a resonant circuit having a resonance characteristic having a variable value affected by the condition of the stylus, the condition having a minimum level and a maximum level, said resonance characteristic having a first value when the level of the condition of the stylus is at the maximum level and a second value when the level of the condition of the stylus is at the minimum level,
providing a first resonance control circuit for causing said variable value to be the first value;
providing a second resonance control circuit for causing said variable value to be the second value;
detecting said variable value, said first value and said second value; and
calculating the level of the condition of the stylus by comparing the variable value to the difference between the first value and the second value.

16. The method of claim 15 wherein the step of detecting the variable value, the first value and the second value comprises the step of controlling said first resonance control circuit and said second resonance control circuit.

17. The method of claim 15 including the step of providing a coil and a capacitor in said resonant circuit.

18. The method of claim 15 wherein the step of comparing the variable value to the first value and the second value comprises the step of subtracting said variable value from said first value to obtain a result and dividing the result by the difference between the first value and the second value.

19. A method of determining a level of pressure applied to a tip of a stylus comprising the steps of:
providing in a stylus a resonant circuit having a resonance characteristic having a variable value affected by pressure applied to the tip of the stylus, the pressure having a minimum level and a maximum level, said resonance characteristic having a first value when the level of the pressure is at the maximum level and a second value when the level of the pressure is at the minimum level,
providing a first resonance control circuit for causing said variable value to be the first value;
providing a second resonance control circuit for causing said variable value to be the second value;
detecting said variable value, said first value and said second value; and
calculating the level of pressure by subtracting the variable value from the first value to obtain a result and dividing the result by the difference between the first value and the second value.

* * * * *